April 15, 1958    E. J. HERBENAR    2,830,767
SELECTOR VALVE
Filed Jan. 6, 1956
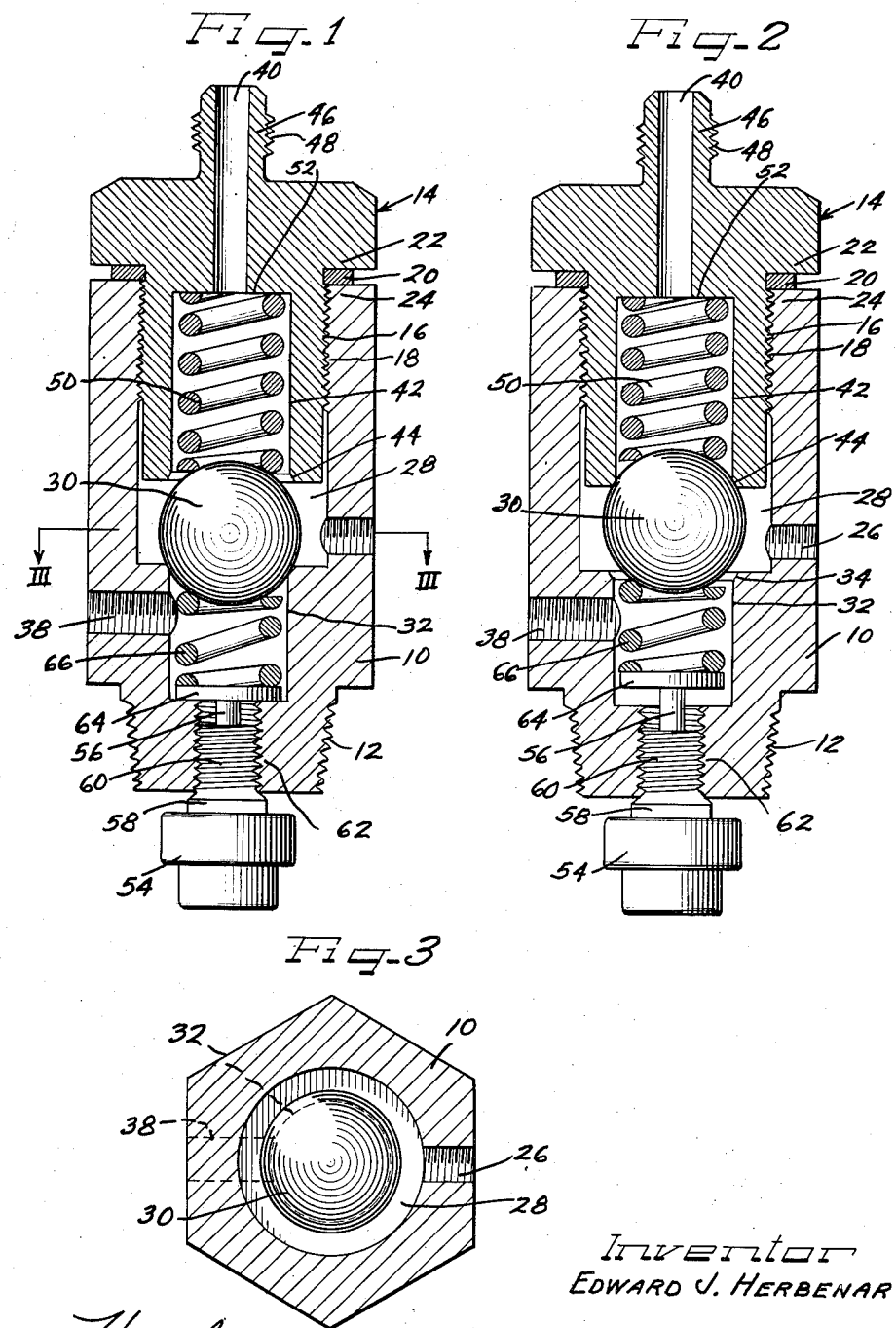
Inventor
EDWARD J. HERBENAR ic_ref>

United States Patent Office 2,830,767
Patented Apr. 15, 1958

2,830,767

SELECTOR VALVE

Edward J. Herbenar, Detroit, Mich., assignor to Thompson Products, Inc., Cleveland, Ohio, a corporation of Ohio Application January 6, 1956, Serial No. 557,670

6 Claims. (Cl. 236—99)

This invention relates to selector valves, and more particularly to selector valves having thermostatically actuated means to automatically open communication to a selected one of a plurality of discharge passageways in response to temperature of associated equipment.

It is an object of the present invention to provide a new and improved selector valve of the type indicated above which will be simple and economical in manufacture and assembly.

Another object is to provide such a valve of novel construction which will provide effective and positive control characteristics, and which will be durable and give relatively trouble-free performance over an extended life.

These and other objects, features, and advantages of the present invention will be readily apparent from the following description of an exemplary preferred embodiment thereof, taken in conjunction with the accompanying drawings, in which:

Figure 1 is a longitudinal cross-sectional view taken axially through a selector valve according to the present invention, the parts being shown during a condition below the temperature at which the thermostatic element is actuated;

Figure 2 is a longitudinal axial cross-sectional view similar to Figure 1, but showing the parts in a condition at or above the temperature of response of the thermostatic element; and Figure 3 is a transverse cross-sectional view taken substantially along the line III—III of Figure 1.

As exemplary of the present invention, there is shown a thermostatically controlled selector valve having a hollow casing or body member 10. The body member 10 is provided with means such as the threads 12 which adapt it to be secured to and supported by the associated equipment such as a water jacket (not shown), the temperature of which the selector valve is to be responsive. The body member 10 is shown as of hexagonal shape, to permit it to be conveniently threaded to an appropriate fitting of the associated equipment.

Closure means such as a plug 14 shown closes the other end of the body 10. The plug 14 is desirably threaded as by external threads 16 to mate with internal threads 18 provided in the bore of body 10, and a sealing means such as a gasket 20 is desirably provided between a shoulder 22 of plug 14 and an end face 24 of the body 10.

According to the present invention, the device includes a plurality of passageways, one of which is adapted to provide an inlet and others of which are adapted to provide a plurality of outlets, and a thermal-responsive valve member is provided to alternatively close one or the other of said outlet passages.

Toward that end, the body member 10 is provided with inlet means such as the inlet port or passageway 26, desirably threaded, which leads to a central chamber 28 of the body 10. Within the chamber 28 is disposed a valve member such as a ball 30 adapted to cooperate with valve seat means now to be described to provide the desired selective flow.

To provide such valve seat means, an end portion of body member 10 is provided with a recess 32 shown as co-axial with the central chamber 28, and of a diameter somewhat smaller than the diameter of the ball 30. The annular corner 34 at the mouth of recess 32 is shown as beveled off to provide a seat for the ball 30.

An outlet passageway means, desirably threaded, such as the passageway 38 shown leads from the recess 32, and hence on a side of valve seat 34 remote from the inlet 26. With the parts in the position shown in Figure 1, with the ball 30 seated upon the seat 34, no liquid can pass from chamber 28 to recess 32, and hence no liquid will be discharged out the discharge passageway 38.

A second outlet passageway 40 is provided by the plug 14. As shown, the passageway 40 is disposed longitudinally of the plug 14, and generally co-axially with respect to a bore or recess 42 which communicates with the central body chamber 28. The mouth 44 of the recess 42 is beveled to provide an upper valve seat for the ball 30. The outlet passage 40 is shown as extending through a head or projection 46 shown as provided with external threads 48 adapted to receive a mating end member of an associated conduit means not shown.

Accordingly, it will be apparent that with the parts as shown in Figure 1, with the ball 30 seated upon the lower valve seat 34, no material will be discharged through outlet 38, but material will be discharged across the valve seat 44 and through the plug recess 42 and through the discharge passageway 40.

A return spring means is desirably provided to bias the ball 30 into seating relation with the valve seat 34. As shown, such means comprises a coil compression spring 50 disposed coaxially with the plug recess 42 and having its ends bottomed respectively against the ball 30 and against a radially extending shoulder 52 at the end of the plug recess 42.

Thermal-responsive means are provided for causing the ball 30 to shift from the position shown in Figure 1, in which it is seated upon the valve seat 34 to block flow through the discharge outlet 38, but to permit flow across valve seat 44 through outlet 40, to a second position as shown in Figure 2. In the condition shown in Figure 2, the ball 30 is seated against the upper valve seat 44 to block flow through discharge outlet 40 but to permit flow across valve seat 34 and out through discharge outlet 38.

As shown, such thermal-responsive means comprise a thermal element 54 of a so-called power or wax type. It has a power member or piston 56 extensible from a cylinder 58 at a selective temperature. The thermal element 54 may be of the type which contains a thermally expansible material, which may be wax alone or a wax and a powdered heat conducting material and binder, and may be of the same general type as shown and described in the Patent No. 2,368,181 issued to Sergius Vernet on January 30, 1945. Such an element is commonly known as a "Vernet" or "Verney" thermal element. In such an element, the thermally expansible material carried within the casing expands as it reaches its fusion point and thereupon acts to extend the piston 56 from the cylinder 58.

The thermal element 54 is shown as carried by threads 60 on the cylinder 58 thereof, which threads 60 engage mating threads 62 provided in the base of the body member 10. Those body threads 62 are provided on a bore shown as extending coaxially with the body base threads 12 and with the axis of the valve seats 34 and 44.

The upper end of the thermally actuatable piston 56 carries an enlarged head 64, upon which is bottomed a spring 66, the other end of which thrustingly engages the ball 30. The spring 66 is stronger than the return spring 50, and is adapted to transmit the normal thrust of piston 56 and piston head 64 to raise ball 30, but is also adapted to resiliently compress to accommodate over-travel of the piston 56 after it has raised the ball 30 to the limit permitted by the valve seat 44.

It may be noted that although the valve seats 34, 44, plug 14, body member 10, and thermal element 54 are desirably generally aligned and as shown are co-axial, the ball will rock to accommoate variations in alignment. Thus wide tolerances are permitted, the relatively loose carry provided by the springs 50 and 66 permitting the necessary shifting of ball 30 to seat on either of the generally opposed valve seats.

In brief summary of the embodiment herein described and illustrated for purposes of disclosure, it will be observed that communication from an inlet passageway 26 is alternatively provided with outlet passageways 38 and 40. Such communication is controlled by a valve ball 30 adapted to selectively seat against the opposed valve seats 34 and 44. The ball 30 is raised from a normally downwardly biased position shown in Figure 1 to an elevated position as shown in Figure 2 by a thermal-responsive element 54, the extensible plunger or piston 56 which acts through an over travel spring 66 to lift the ball 30. In its raised position, the ball 30 is seated up against the valve seat 44, thus blocking communication to the outlet passageway 40 but permitting discharge across valve seat 34 and discharge outlet 38. At temperatures below the temperature of actuation of the thermal element 54, the piston 56 thereof withdraws or lowers to permit the return spring 50 above the ball 30 to force the ball 30 downward to seating engagement with the valve seat 34 and off the valve seat 44, thus blocking discharge through discharge 38 and reopening discharge through discharge outlet 40.

A selector valve so constructed may be simply and economically manufactured and assembled. It will give positive control to effect the desired discharge selection characteristics in response to temperature. It is very durable, and will be effective for prolonged operation with little or no maintenance and service, and give extended seat life.

It will thus be seen from the foregoing description of my invention according to an exemplary preferred embodiment, considered in conjunction with the accompanying drawings, that the present invention provides a new and improved thermostatically controlled selector valve having the desired advantages and characteristics, and accomplishing its intended objects, including those hereinbefore pointed out and others which are inherent in the invention as described.

It will be understood that modifications and variations may be effected without departing from the scope of the novel concepts of the present invention.

I claim as my invention:

1. A thermostatically controlled selector valve, comprising a valve body member provided with a central chamber and a base portion externally threaded for connection of said body member to associated equipment to the temperature of which said selector valve is to be temperature-responsive, a rigid ball valve received in said central chamber, the upper portion of said body member provided with a plug means for closing said upper end of said central chamber and providing a valve seat for seating said rigid ball valve, said plug means being provided with a bore opening to said valve seat, a coil spring disposed in said bore in said plug means, an outlet passageway means provided by said plug means and communicating with said bore, said base portion providing a second valve seat for said rigid ball valve, said base portion being provided with a bore opening to said second valve seat, a coil spring assembled in said bore in said base portion, an outlet passageway provided by said base portion and communicating with said bore in said base portion, an inlet passageway provided by said base portion and communicating with said central chamber, a temperature-responsive element carried by said body member and extending into said bore in said base portion and in contact with the end of the spring therein, said rigid ball valve resiliently supported solely by the free end portions of said springs assembled in said bores, said valve seats in said plug and said base portion providing opposed valve seats facing said chamber for alternately seating said ball valve, said temperature-responsive means being operative to control the position of said rigid ball valve with respect to the valve seats to progressively open one outlet passageway means and to close the second outlet passageway means when the ball valve means is moved in one direction against one of said valve seats and to progressively open the second outlet passageway means and to close the first outlet passageway means when the ball valve means is moved in the opposite direction against the other of said valve seats.

2. A thermostatically controlled valve body member provided with a central chamber, inlet passageway means leading to said central chamber, a rigid ball valve received in said chamber, a plug means threadedly engaging said body member for closing one end of said chamber and providing a valve seat for seating said rigid ball valve, said plug means being provided with a bore opening to said valve seat, a coil spring disposed in said bore in said plug means, an outlet passageway means provided by said plug means and communicating with said bore, said body member providing a second valve seat for said rigid ball valve, said body member being provided with a bore opening to said second valve seat, a coil spring disposed in said bore in said body member, and an outlet passageway means provided by said body member and communicating with said bore in said body member, said rigid ball valve resiliently supported solely by the free ends of said coil springs in said bores, thermostatic element means carried by said body and adapted to control the position of said rigid ball valve with respect to said valve seats through the intermediation of the spring in said bore in said body member to progressively open the passageway means in said plug means and to close the passageway means connected with said body member when the ball valve is moved in one direction against said valve seat in said body member and to progressively open the outlet in said body member and to close the outlet in said plug means when the ball valve is moved in the opposite direction against the valve seat in said plug means.

3. A thermostatically controlled selector valve, comprising a valve body member provided with a central chamber, inlet passageway means leading to said central chamber, a rigid ball valve received in said chamber, a plug means threadedly engaging said body member for closing one end of said chamber and providing a valve seat for seating said rigid ball valve, said plug means being provided with a bore opening to said valve seat, a coil spring deposited in said bore in said plug means and having one end thereof in contact with said rigid ball valve, an outlet passageway means provided by said plug means and communicating with said bore, said body member providing a valve seat for said rigid ball valve, said body member being provided with a bore opening to said valve seat, an overtravel coil spring disposed in said bore in said body member, and an outlet passageway means provided by said body member and communicating with said body member bore, thermostatic element means carried by said body member and adapted to control the position of said rigid ball valve with respect to the valve seat to progressively arrest and release communication from said inlet passageway means to the said outlet passageway means, said spring disposed in said plug bore to bias said rigid ball valve off said plug means valve seat and into sealing relation with said body member valve seat, and said overtravel spring disposed in said body member bore being in thrust-transmitting relationship between said thermostatic element means and said rigid ball valve.

4. A thermostatically controlled valve means providing a chamber, a rigid ball valve in said chamber resiliently biased and solely supported by a plurality of coil springs, a plug means threadedly engaging said body member for closing the upper end of said chamber and providing a valve seat for seating said rigid ball valve, said plug means being provided with a bore opening to said valve seat in said plug means, one of said coil springs disposed in said bore in said plug means, the base portion of said body member providing a second valve seat for sealing said rigid ball valve, said base portion provided with a bore opening to said second valve seat, one of said coil springs disposed in said bore in said base portion, said seats operatively facing each other in said chamber, means providing outlet passageways communicating with said first and second valve seats, means providing an inlet passageway communicating with said chamber between said valve seats, and temperature-responsive means operatively engaging the end of one of said springs biasing said rigid ball valve and adapted to selectively seat said rigid ball valve on either of said valve seats, said coil spring arranged between said temperature-responsive means and said ball valve being of greater strength than the second coil spring in said central chamber for relieving excess pressure of said temperature-responsive means.

5. A thermostatically controlled selector valve, comprising a valve body member provided with a central chamber, an inlet passageway communicating with said central chamber, an outlet passageway means in said valve body leading from said central chamber, a non deformable ball valve received in said central chamber, a plug means threadedly engaging said body member for closing one end of said central chamber and providing a valve seat for seating said rigid ball valve, said plug means being provided with bore opening to said valve seat, a coil spring disposed in said bore in said plug means, an outlet passageway means in said plug means and communicating with said bore, said body member providing a valve seat for said rigid ball valve, said body member being provided with a bore opening to said valve seat in said body member, a coil spring disposed in said bore in said body member, and a passageway means provided by said body member and communicating with said bore in said body member, said non-deformable ball valve resiliently supported solely by the free ends of said coil springs in said bores, thermostatic element means carried by said body and adapted to control the position of said ball valve with respect to the valve seats through the intermediation of said spring in said bore in said body member to arrest and release communication from said outlet passageway means, said spring in said bore in said body member being of greater strength than the spring in said bore in said plug means, and said spring disposed in said plug bore of sufficient strength to bias said ball valve off said plug means valve seat and into seating relation with said body member valve seat when said thermostatic element is dormant.

6. A selector valve, comprising a valve body member provided with a central chamber, an inlet passageway means in said valve body leading to said central chamber, a ball valve received and resiliently supported and biased in said central chamber, a plug means threadedly engaging said body member for closing one end of said central chamber and providing a valve seat for seating said ball, said plug means being provided with a bore opening to said valve seat, a coil spring disposed in said bore in said plug means and having one end thereof in contact with said ball valve, a passageway means in said plug means and communicating with said bore, said body member providing a valve seat for said ball, said body member being provided with a bore open to said valve seat, a passageway means provided by said body member for communicating with said body member bore, an overtravel coil spring disposed in said bore in said body member, said overtravel coil spring being of greater strength than the spring deposited in said plug, thermostatic element means carried by said body and adapted to control the position of said ball valve with respect to the valve seat to rest and release communication from said passageway in said valve body to said passageway in said plug means, said spring disposed in said plug bore to bias said ball off said plug means valve seat and into seating relation with said body member valve seat, and said overtravel spring disposed in said body member for being in thrust-transmitting relationship between said thermostatic element means and said ball.

References Cited in the file of this patent

UNITED STATES PATENTS

| | | |
|---|---|---|
| 1,549,745 | Church | Aug. 8, 1925 |
| 1,773,976 | Erickson | Aug. 26, 1930 |
| 1,989,585 | Bigelow | Jan. 29, 1935 |
| 2,257,442 | Yula | Sept. 30, 1941 |
| 2,265,117 | Seymour | Dec. 2, 1941 |
| 2,371,428 | De Giers et al. | Mar. 13, 1945 |
| 2,600,650 | Hieger | June 17, 1952 |
| 2,751,152 | Ellenberger | June 19, 1956 |

FOREIGN PATENTS

| | | |
|---|---|---|
| 194,366 | Great Britain | Mar. 5, 1923 |